(12) United States Patent
Boland

(10) Patent No.: US 10,017,160 B2
(45) Date of Patent: Jul. 10, 2018

(54) METHOD FOR MANUFACTURING A WINDSHIELD WIPER BLADE

(71) Applicant: FEDERAL-MOGUL S.A., Aubange (BE)

(72) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 227 days.

(21) Appl. No.: 14/892,455

(22) PCT Filed: May 22, 2013

(86) PCT No.: PCT/EP2013/060525
§ 371 (c)(1),
(2) Date: Nov. 19, 2015

(87) PCT Pub. No.: WO2014/187481
PCT Pub. Date: Nov. 27, 2014

(65) Prior Publication Data
US 2016/0090066 A1    Mar. 31, 2016

(51) Int. Cl.
*B60S 1/38*     (2006.01)
*B29C 47/00*   (2006.01)
(Continued)

(52) U.S. Cl.
CPC .............. *B60S 1/38* (2013.01); *B05D 1/00* (2013.01); *B29C 43/14* (2013.01);
(Continued)

(58) Field of Classification Search
CPC .. B60S 1/38; B05D 1/00; B29C 43/14; B29C 45/0055; B29C 47/003; B29C 47/0066; B29C 47/04; B29C 69/001; B29C 69/00
(Continued)

(56) References Cited

U.S. PATENT DOCUMENTS

| | | | | |
|---|---|---|---|---|
| 3,035,297 A | * | 5/1962 | Overman | B60S 1/38 |
| | | | | 15/250.48 |
| 5,478,605 A | * | 12/1995 | Ichise | B26D 3/08 |
| | | | | 15/250.48 |
| 2011/0232022 A1 | * | 9/2011 | Huang | B29C 43/021 |
| | | | | 15/250.41 |

FOREIGN PATENT DOCUMENTS

DE     1030554 B    5/1958
EP     0657331 A1   6/1995
(Continued)

OTHER PUBLICATIONS

International Search Report, dated Aug. 12, 2013 (PCT/EP2013/060525).

*Primary Examiner* — Monica Carter
*Assistant Examiner* — Katina Henson
(74) *Attorney, Agent, or Firm* — Robert L. Stearns; Dickinson Wright, PLLC

(57) ABSTRACT

A method for manufacturing an elongated windshield wiper blade includes providing a tandem wiper blade (1) made in one piece of an elastomeric material, which is composed of two wiper blades (2, 3) integrally joined together, and subsequently cutting the tandem wiper blade (1) so as to separate the two wiper blades (2, 3) each having a wiping head (4) facing away from a windshield to be wiped and a wiping lip (5) to be placed in abutment with a windshield to be wiped. The two wiper blades (2, 3) forming the tandem wiper blade (1) are integrally joined together at the location of their wiping heads (4) facing towards each other, wherein the tandem wiper blade (1) is cut into the two separate wiper blades (2, 3) along their wiping heads (4) facing towards each other.

10 Claims, 3 Drawing Sheets

Figure 1:
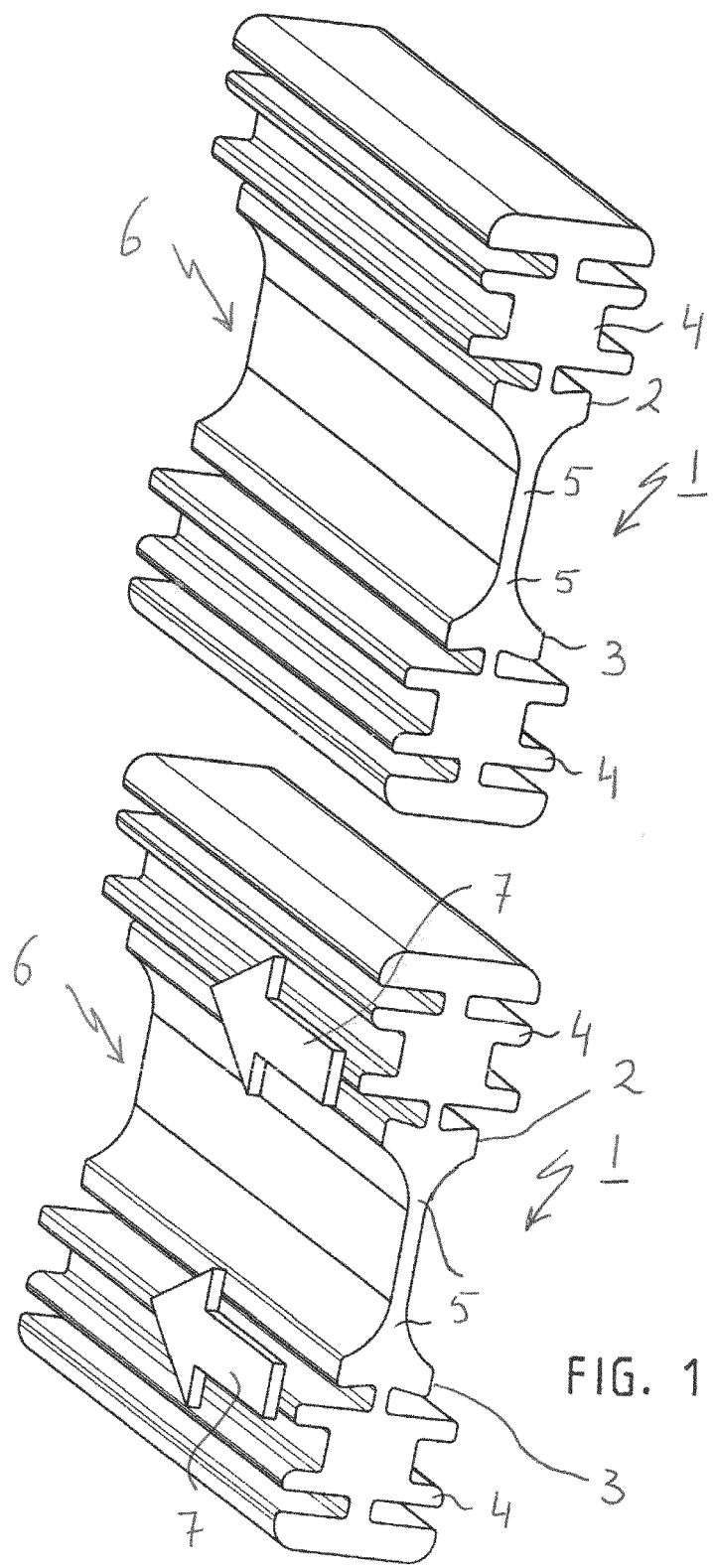

(51) Int. Cl.
  *B29C 47/04* (2006.01)
  *B05D 1/00* (2006.01)
  *B29C 43/14* (2006.01)
  *B29C 45/00* (2006.01)
  *B29C 69/00* (2006.01)
  *B29L 31/30* (2006.01)

(52) U.S. Cl.
  CPC ........ *B29C 45/0055* (2013.01); *B29C 47/003* (2013.01); *B29C 47/0066* (2013.01); *B29C 47/04* (2013.01); *B29C 69/001* (2013.01); *B29L 2031/305* (2013.01); *B60S 2001/3829* (2013.01); *B60S 2001/3836* (2013.01); *B60S 2001/3839* (2013.01); *B60S 2001/3898* (2013.01)

(58) Field of Classification Search
  USPC ....................................................... 15/250.04
  See application file for complete search history.

(56) References Cited

FOREIGN PATENT DOCUMENTS

| | | |
|---|---|---|
| EP | 1050442 A1 | 11/2000 |
| JP | S6126669 U | 2/1986 |
| SE | 450699 B | 7/1987 |

\* cited by examiner

METHOD FOR MANUFACTURING A WINDSHIELD WIPER BLADE

BACKGROUND OF THE INVENTION

1. Technical Field

The present invention relates to a method for manufacturing an elongated windshield wiper blade to be placed in abutment with a windshield to be wiped, the method comprising the steps of providing a tandem wiper blade made in one piece of an elastomeric material, which is composed of two wiper blades integrally joined together; and subsequently cutting the tandem wiper blade so as to separate the two wiper blades each having a wiping head facing away from a windshield to be wiped and a wiping lip to be placed in abutment with a windshield to be wiped.

2. Related Art

Such a method is generally know, for example from European patent publication no. 0 657 331 (Fukoku). Use is made of a tandem wiper blade formed by a strip of starting material of rubber, wherein the strip of starting material consists of two wiper blades whose respective wiping edges are directed towards each other so as to form a common lip portion. A surface coating of nylon or graphite, for example, is applied to the tandem wiper blade, wherein rotary knives are used to separate the wiper blades. As small notches are formed by the rotary knives inside the common lip portion prior to applying the surface coating, wiping edges of the wiping lips of the wiper blades will not be covered with the surface coating, so that wiping properties thereof will not be deteriorated. In addition thereto, sharp edges of the rotary knives will not be abraded by the surface coating.

A disadvantage of the method known from the European patent publication no. 0 657 331 is that the form of the common lip portion and thereof also the forms of the wiping lips of the wiper blades forming the common lip portion cannot be accurately controlled. In practice this has led to a deformation of the wiping lips of the wiper blades resulting in inferior wiping properties thereof.

SUMMARY OF THE INVENTION

It is an objective of the present invention to improve the prior art, particularly to improve the wiping properties of the obtained wiper blades due to a reliable control of the form/shape of the wiping lips thereof.

In order to accomplish that objective a method indicated in the introduction is characterized in that the two wiper blades forming the tandem wiper blade are integrally joined together at the location of their wiping heads facing towards each other; and the tandem wiper blade is cut into the two separate wiper blades along their wiping heads facing towards each other.

In other words, the wiper blades are produced in double strand, while they are interconnected along end sides of their wiping heads, i.e. "back to back". The present invention is particularly based on the awareness that in the prior art a compression force forces the two wiper blades in the tandem blade to move towards the centre of the tandem blade during manufacturing, resulting in a deformation of the wiping lips thereof. This is particularly the case when an extrusion technique is used, wherein, particularly in case the tandem blade is not precisely balanced during extrusion, an extrusion force ("flow") induces the movement of the wiper blades in the direction of the centre of the tandem blade. In the present invention, particularly in case an extrusion technique is used, a traction force is exerted outwards the centre of the tandem blade at the location of interconnection between the wiper blades in the tandem blade, i.e. at the location of their wiping heads facing towards each other, induced by an extrusion force ("flow"). In the latter case a stable extrusion process is obtained.

This is all contrary to contemporary thinking in the sense that in the prior art a tandem blade is to be composed of two wiper blades integrally joined together at narrow sides of the wiping lips thereof. Thereby the present invention overcomes a prejudice which has long existed in the wiper field.

In case aid tandem blade is provided with feet integrally joined together with the wiping lips in order to stabilize the tandem blade, the wiper blades are ready for use after being separated and after the feet being cut off.

In a preferred embodiment of a method in accordance with the invention the tandem wiper blade is provided with a surface coating prior to being cut. In the alternative the wiper blades are provided with a surface coating after being separated. In the latter case measures are to be taken to avoid that a wiping edge of the wiping lip thereof, which is intended to make contact with a windshield of a vehicle, is covered with the surface coating, resulting otherwise in a reduced friction between the wiper blade and the windshield and thus in a deterioration of the wiping properties of the wiper blade. The purpose of the surface coating is to improve the weather, wear and chemical resistance of the wiper blades, as well as to slow down the ageing process thereof. the surface coating is preferably a polymer coating that is particularly formed directly from a monomer gas by using plasma energy.

In a further preferred embodiment of a method according to the invention the tandem wiper blade is made using an extrusion technique. Preferably one polymer material is extruded, whereas in case of co-extrusion two or more polymer materials are used.

In a further preferred embodiment of a method in accordance with the invention the wiping head and the wiping lip of each wiper blade are in one piece and interconnected by a tilting web. Preferably, the wiping lip of each wiper blade is widening into wedge shoulders toward the tilting web. the wedge shoulders extend laterally outwardly.

In a further preferred embodiment of a method according to the invention the wiping head of each wiper blade is provided with one central groove in which a longitudinal strip of an elongated, elastic carrier element is to be disposed. In the alternative the wiping head of each wiper blade is provided with two opposite grooves each open at one lateral longitudinal side thereof, in each of which a longitudinal strip of an elongated, elastic carrier element is to be disposed. Accordingly both embodiments refer to a windscreen wiper device of the "flat blade type", wherein no use is made of several yokes pivotally connected to each other, but wherein the wiper blade thereof is biased by the carrier element, as a result of which it exhibits a specific curvature.

The present invention also refers to a tandem wiper blade to be used in a method in accordance with the invention. The present invention also refers to a wiper blade manufactured by a method according to the invention.

THE DRAWINGS

Figure 2:
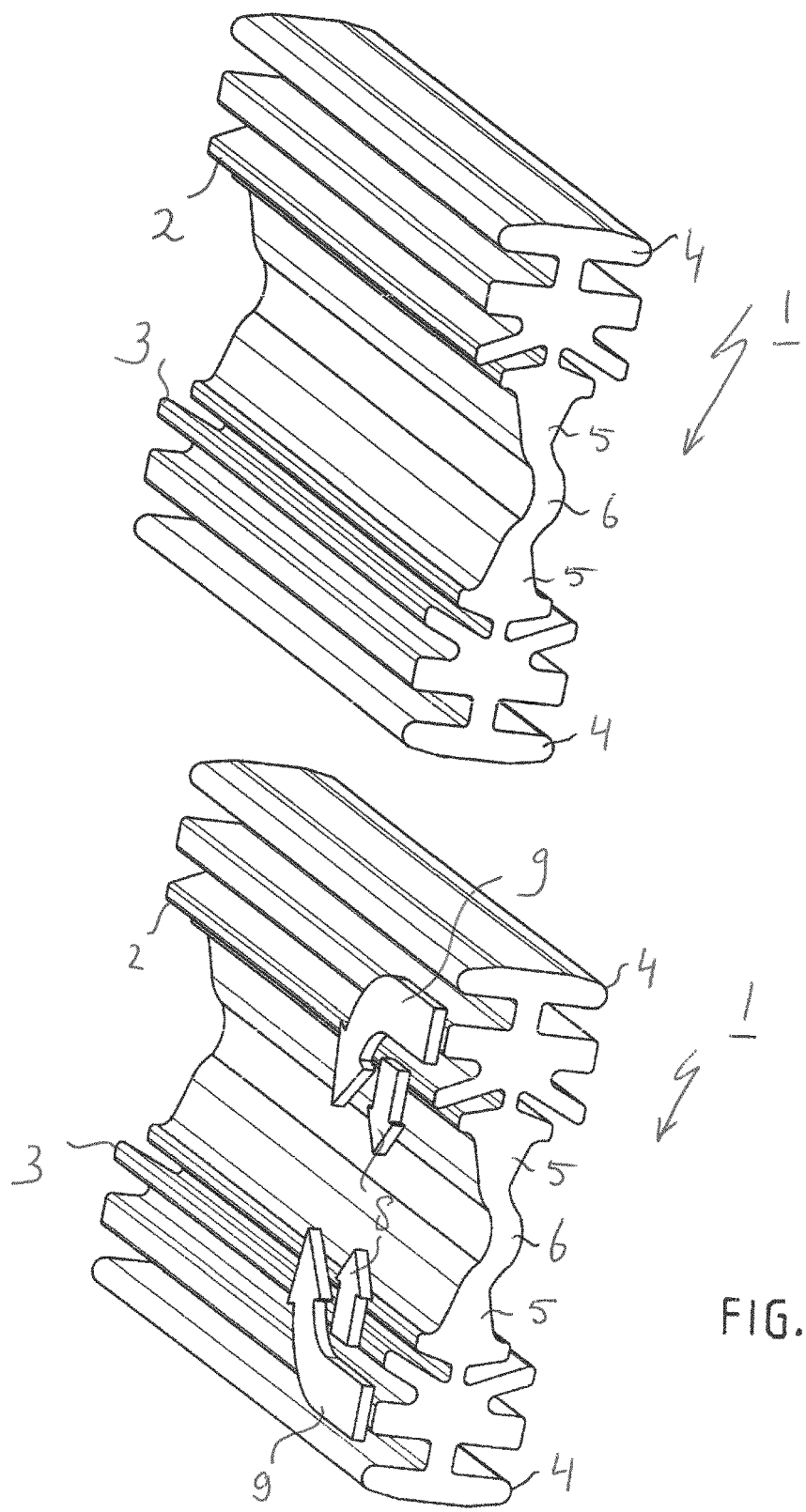
Figure 3:
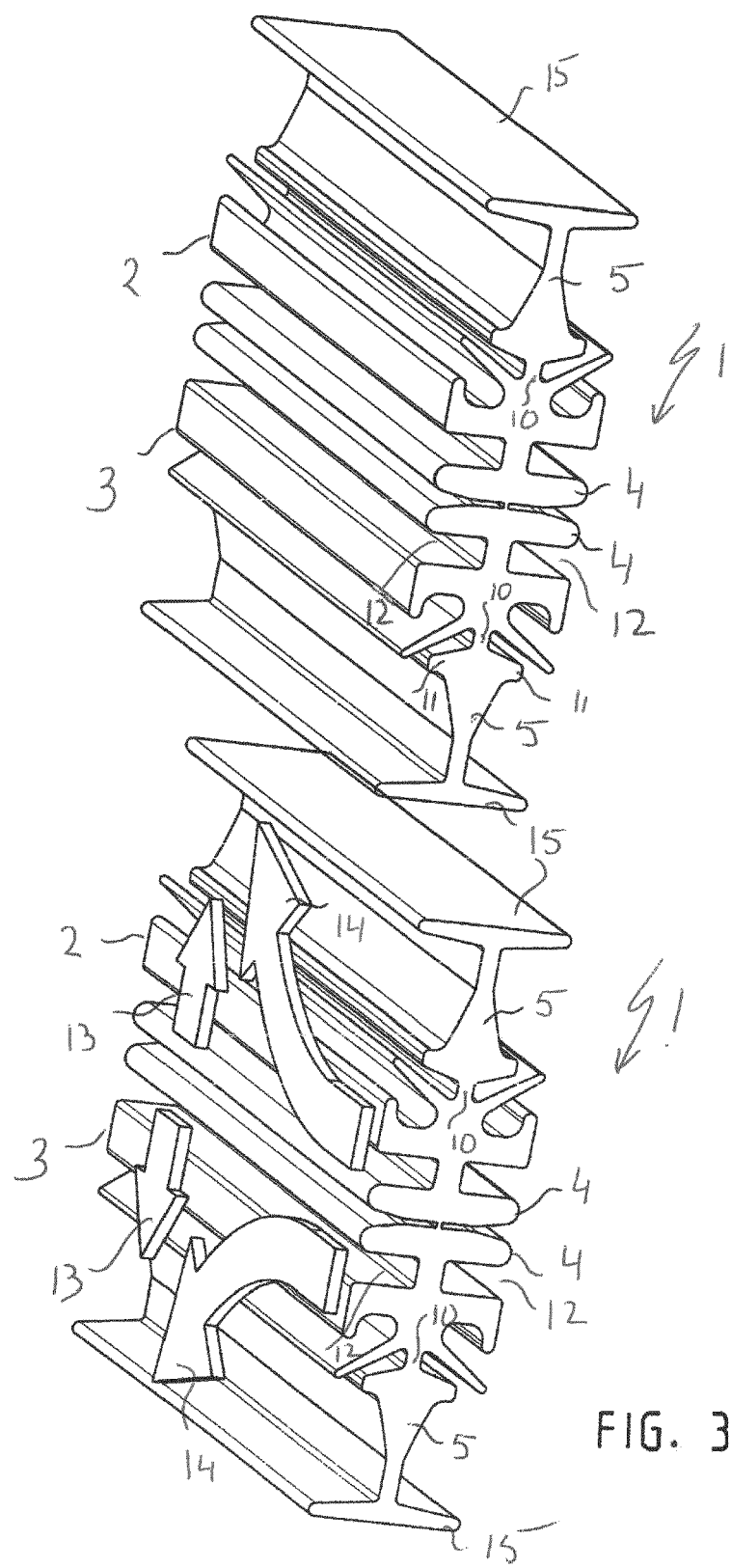

The present invention will now be further elucidated with reference to the accompanying drawings, in which FIGS. 1 and 2 show a schematic, perspective view of a tandem blade formed by a strip of starting material according to the prior art; and FIG. 3 corresponds to FIGS. 1 and 2, but now relating to a preferred embodiment according to the invention.

DETAILED DESCRIPTION

In FIG. 1 a tandem wiper blade 1 made of a rubber strip of starting material is shown, wherein the tandem wiper blade 1 is in one piece and is composed of two wiper blades 2,3 each having a wiping head 4 facing away from a windshield to be wiped and a wiping lip 5 facing towards a windshield to be wiped, i.e. to be placed with its wiping edge in abutment with a windshield to be wiped. the wiper blades 2,3 in the tandem wiper blade 1 are integrally joined together at narrow sides of the wiping lips 5 thereof so as to form a common lip portion 6. The tandem wiper blade 1 is made by means of an extrusion process, wherein arrows 7 indicate the direction of movement thereof during extrusion. After being extruded, the tandem wiper blade 1 is subsequently cut in the middle of the lip portion 6 so as to separate the two wiper blades 2,3.

With reference to FIG. 2 a compression force in the direction of arrows 8 forces the two wiper blades 2,3 in the tandem wiper blade 1 to move towards the centre of the tandem blade 1 during manufacturing. This has the result of a deformation of the lip portion 6 and thus of the wiping lips 5 defining the lip portion 6. This is particularly the case when during extrusion the tandem wiper blade 1 is not precisely balanced, so that an extrusion force in the direction of arrows 9 ("flow") induces the movement of the wiper blades 2,3 in the direction of the centre of the tandem wiper blade 1.

FIG. 3 corresponds to FIGS. 1 and 2, but now relating to a preferred embodiment according to the invention, wherein corresponding parts have been designated with the same reference numerals.

In FIG. 3 is shown a tandem wiper blade 1 made of a rubber strip of starting material, wherein the tandem blade 1 is in one piece and consists of two wiper blades 2,3 each having a wiping head 4 facing away from a windshield to be wiped and a wiping lip 5 facing towards a windshield to be wiped, i.e. to be placed with its wiping edge in abutment with a windshield to be wiped. the wiper blades 2,3 each are part of a windscreen wiper device of the "flat blade type", wherein no use is made of several yokes pivotally connected to each other, but wherein the wiper blade 2,3 thereof is biased by the carrier element, as a result of which it exhibits a specific curvature. As shown, the wiping head 4 and the wiping lip 5 of each wiper blade 2,3 are in one piece and interconnected by a tilting web 10. the wiping lip 5 of each wiper blade 2,3 is widened into wedge shoulders 11 toward the tilting web 10. the wiping head 4 of each wiper blade 2,3 is further provided with two opposite grooves 12 each open at one lateral longitudinal side thereof, in each of which a longitudinal strip of an elongated, elastic carrier element is to be disposed. In the alternative there is one central groove accommodating a central longitudinal strip.

the wiper blades 2,3 in the tandem wiper blade 1 are integrally joined together at the location of their wiping heads 4 facing towards each other. The tandem blade 1 is made by means of an extrusion process, wherein the tandem wiper blade is subsequently cut into the two separate wiper blades 2,3 along their wiping heads 4 facing towards each other. the tandem wiper blade 1 is provided with a surface coating prior to being cut.

During extrusion a traction force in the direction of arrows 13 is exerted at the location of interconnection between the wiper blades 2,3 in the tandem blade 1, i.e. at the location of their wiping heads 4 facing towards each other, induced by an extrusion force ("flow") in the direction of arrows 14. In order to further stabilize the tandem wiper blade 1 the wiping lips 5 at the location of their wiping edges are provided with a profile or foot 15 in the form of a plate to be cut off before the wiper blades 2,3 being ready for use.

The present invention is not restricted to the embodiments shown, but extends also to other preferred embodiments falling within the scope of the appended claims.

The invention claimed is:

1. A method for manufacturing an elongated windshield wiper blade to be placed in abutment with a windshield to be wiped, said method comprising the steps of providing a tandem wiper blade made in one piece of an elastomeric material, which is composed of two wiper blades integrally joined together; and subsequently cutting said tandem wiper blade so as to separate said two wiper blades each having a wiping head facing away from a windshield to be wiped and a wiping lip to be placed in abutment with a windshield to be wiped;

wherein said two wiper blades that form said tandem wiper blade are integrally joined together at the location of their wiping heads facing towards each other; and said tandem wiper blade is cut into said two separate wiper blades along their wiping heads facing towards each other.

2. The method according to claim 1, wherein said tandem wiper blade is provided with a surface coating prior to being cut.

3. The method according to claim 1, wherein said wiper blades are provided with a surface coating after being separated.

4. The method according to claim 2, wherein said surface coating is a polymer coating.

5. The method according to claim 1, wherein said tandem wiper blade is made by extrusion, injection molding or compression molding.

6. The method according to claim 1, wherein said wiping head and said wiping lip of each wiper blade are formed in one piece and interconnected by a tilting web.

7. The method according to claim 6, wherein said wiping lip of each wiper blade is formed to widen into wedge shoulders toward said tilting web.

8. The method according to claim 1, wherein said wiping head of each wiper blade is provided with one central groove in which a longitudinal strip of an elongated, elastic carrier element is to be disposed.

9. The method according to claim 1, wherein said wiping head of each wiper blade is formed with two opposite grooves each groove open at one lateral longitudinal side thereof, in each of which a longitudinal strip of an elongated, elastic carrier element is to be disposed.

10. The method according to claim 3, wherein said surface coating is a polymer coating.

* * * * *